US012626864B2

(12) United States Patent
Lin et al.

(10) Patent No.: US 12,626,864 B2
(45) Date of Patent: May 12, 2026

(54) CAPACITOR ASSEMBLY PACKAGE STRUCTURE AND METHOD OF MANUFACTURING THE SAME, AND ELECTRONIC DEVICE

(71) Applicant: APAQ TECHNOLOGY CO., LTD., Miaoli County (TW)

(72) Inventors: Chieh Lin, Hsinchu County (TW); Yi-Ying Wang, Hsinchu City (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 101 days.

(21) Appl. No.: 18/610,362

(22) Filed: Mar. 20, 2024

(65) Prior Publication Data

US 2025/0087420 A1    Mar. 13, 2025

(30) Foreign Application Priority Data

Sep. 12, 2023    (TW) ................................. 112134599

(51) Int. Cl.
*H01G 4/22* (2006.01)
*H01G 4/005* (2006.01)
*H01G 4/224* (2006.01)
*H01G 4/30* (2006.01)

(52) U.S. Cl.
CPC ............. *H01G 4/224* (2013.01); *H01G 4/005* (2013.01); *H01G 4/30* (2013.01)

(58) Field of Classification Search
CPC .......... H01G 4/224; H01G 4/005; H01G 4/30; H01G 9/10; H01G 9/15
See application file for complete search history.

(56) References Cited

U.S. PATENT DOCUMENTS

| | | | | |
|---|---|---|---|---|
| 2020/0082993 A1* | 3/2020 | Wu | ............................ | H01G 9/10 |
| 2020/0118765 A1* | 4/2020 | Tanaka | ...................... | H01G 9/15 |
| 2020/0303130 A1* | 9/2020 | Furukawa | .............. | H01G 9/048 |
| 2020/0328031 A1* | 10/2020 | Wu | ......................... | H01G 4/008 |
| 2020/0335284 A1* | 10/2020 | Yamazaki | .............. | H01G 9/025 |
| 2021/0175023 A1* | 6/2021 | Lin | ......................... | H01G 9/048 |
| 2021/0327651 A1* | 10/2021 | Lin | ......................... | H01G 9/012 |
| 2023/0076194 A1* | 3/2023 | Fukui | ...................... | H01G 9/07 |

* cited by examiner

Primary Examiner — Michael P McFadden
(74) *Attorney, Agent, or Firm* — Li & Cai Intellectual Property (USA) Office

(57) ABSTRACT

A capacitor assembly package structure and a method of manufacturing the same, and an electronic device are provided. The capacitor assembly package structure includes a capacitor assembly, a plurality of first insulating package bodies, a second insulating package body and an electrode assembly. The capacitor assembly includes a plurality of capacitor structures. The capacitor assembly has a plurality of stacking gaps. The first insulating package bodies are respectively received in the stacking gaps of the capacitor assembly. The second insulating package body is configured to cover the first insulating package bodies and the capacitor structures. The electrode assembly includes a first electrode structure and a second electrode structure. A solid content of each first insulating package body is less than a solid content of the second insulating package body so as to reduce the percentage of multiple pores formed in each stacking gap of the capacitor assembly.

10 Claims, 9 Drawing Sheets

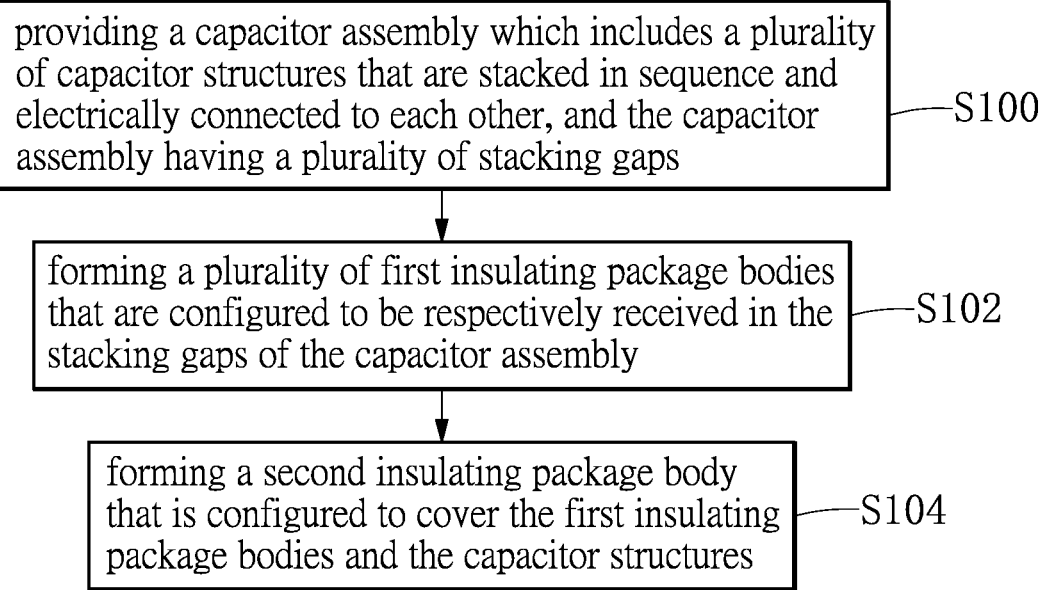

providing a capacitor assembly which includes a plurality of capacitor structures that are stacked in sequence and electrically connected to each other, and the capacitor assembly having a plurality of stacking gaps ⎯S100 forming a plurality of first insulating package bodies that are configured to be respectively received in the stacking gaps of the capacitor assembly ⎯S102 forming a second insulating package body that is configured to cover the first insulating package bodies and the capacitor structures ⎯S104

FIG. 8

CAPACITOR ASSEMBLY PACKAGE STRUCTURE AND METHOD OF MANUFACTURING THE SAME, AND ELECTRONIC DEVICE

CROSS-REFERENCE TO RELATED PATENT APPLICATION

This application claims the benefit of priority to Taiwan Patent Application No. 112134599, filed on Sep. 12, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a capacitor, and more particularly to a capacitor assembly package structure, a method of manufacturing the capacitor assembly package structure, and an electronic device using the capacitor assembly package structure.

BACKGROUND OF THE DISCLOSURE

In general, a plurality of capacitor elements is stacked together to form a stacked solid electrolytic capacitor with a high electrical capacity. In addition, the stacked solid electrolytic capacitor of the related art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another. However, there is still room for improvement in the related art of the wound capacitor.

SUMMARY OF THE DISCLOSURE

In response to the above-referenced technical inadequacy, the present disclosure provides a capacitor assembly package structure and a method of manufacturing the same, and an electronic device, to reduce the percentage of multiple pores formed in each stacking gap of a capacitor assembly (that is to say, to reduce the structural defect rate or structural defect conditions caused by the pores), thereby improving the structural stability of the capacitor assembly package structure (for example, the vibration resistance of multiple capacitor structures of the capacitor assembly package structure can be improved, so that the electrical characteristics of the capacitor assembly package structure provided by the present disclosure are not easily degraded by vibration), and to prevent excessive moisture from accumulating in the pores, thereby reducing the probability of structural cracks in the capacitor assembly package structure during the reflow process.

In order to solve the above-mentioned problems, one of the technical aspects adopted by the present disclosure is to provide a capacitor assembly package structure, which includes a capacitor assembly, a plurality of first insulating package bodies, a second insulating package body and an electrode assembly. The capacitor assembly includes a plurality of capacitor structures that are stacked in sequence and electrically connected to each other, each of the capacitor structures has a positive electrode portion and a negative electrode portion, the capacitor assembly has a plurality of stacking gaps, and each of the stacking gaps is correspondingly formed between two adjacent ones of the capacitor structures. The first insulating package bodies are configured to be respectively received in the stacking gaps of the capacitor assembly. The second insulating package body is configured to cover the first insulating package bodies and the capacitor structures. The electrode assembly includes a first electrode structure and a second electrode structure, the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure. A solid content of each of the first insulating package bodies is less than a solid content of the second insulating package body. A total volume of the first insulating package bodies is smaller than a volume of the second insulating package body. Each of the first insulating package bodies and the second insulating package body have the same or different insulating materials.

In order to solve the above-mentioned problems, another one of the technical aspects adopted by the present disclosure is to provide a method of manufacturing a capacitor assembly package structure, which includes providing a capacitor assembly, in which the capacitor assembly includes a plurality of capacitor structures that are stacked in sequence and electrically connected to each other, each of the capacitor structures has a positive electrode portion and a negative electrode portion, the capacitor assembly has a plurality of stacking gaps, and each of the stacking gaps is correspondingly formed between two adjacent ones of the capacitor structures; forming a plurality of first insulating package bodies that are configured to be respectively received in the stacking gaps of the capacitor assembly; and forming a second insulating package body that is configured to cover the first insulating package bodies and the capacitor structures. A solid content of each of the first insulating package bodies is less than a solid content of the second insulating package body. A total volume of the first insulating package bodies is smaller than a volume of the second insulating package body. Each of the first insulating package bodies and the second insulating package body have the same or different insulating materials.

In order to solve the above-mentioned problems, yet another one of the technical aspects adopted by the present disclosure is to provide an electronic device configured to use a capacitor assembly package structure. The capacitor assembly package structure includes a capacitor assembly, a plurality of first insulating package bodies, a second insulating package body and an electrode assembly. The capacitor assembly includes a plurality of capacitor structures that are stacked in sequence and electrically connected to each other, each of the capacitor structures has a positive electrode portion and a negative electrode portion, the capacitor assembly has a plurality of stacking gaps, and each of the stacking gaps is correspondingly formed between two adjacent ones of the capacitor structures. The first insulating package bodies are configured to be respectively received in the stacking gaps of the capacitor assembly. The second insulating package body is configured to cover the first insulating package bodies and the capacitor structures. The electrode assembly includes a first electrode structure and a second electrode structure, the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure. A solid content of each of the first insulating package bodies is less than a solid content of the second insulating package body. A total volume of the first insulating package bodies is smaller than a volume of the second insulating package body. Each of the first insulating package bodies and the second insulating package body have the same or different insulating materials.

Therefore, in the capacitor assembly package structure provided by the present disclosure, by virtue of "the first insulating package bodies being configured to be respectively received in the stacking gaps of the capacitor assembly," "the second insulating package body being configured to cover the first insulating package bodies and the capacitor structures," "a solid content of each of the first insulating package bodies being less than a solid content of the second insulating package body" and "a total volume of the first insulating package bodies being smaller than a volume of the second insulating package body," the percentage of the pores formed in each stacking gap of the capacitor assembly can be reduced (that is to say, the structural defect rate or structural defect conditions caused by the pores can be reduced), thereby improving the structural stability of the capacitor assembly package structure (for example, the vibration resistance of the capacitor structures of the capacitor assembly package structure can be improved, so that the electrical characteristics of the capacitor assembly package structure provided by the present disclosure are not easily degraded by vibration), and excessive moisture can be prevented from accumulating in the pores, thereby reducing the probability of structural cracks in the capacitor assembly package structure during the reflow process.

Furthermore, in the method of manufacturing the capacitor assembly package structure provided by the present disclosure, by virtue of "forming a plurality of first insulating package bodies that are configured to be respectively received in the stacking gaps of the capacitor assembly," "forming a second insulating package body that is configured to cover the first insulating package bodies and the capacitor structures," "a solid content of each of the first insulating package bodies being less than a solid content of the second insulating package body" and "a total volume of the first insulating package bodies being smaller than a volume of the second insulating package body," the percentage of the pores formed in each stacking gap of the capacitor assembly can be reduced (that is to say, the structural defect rate or structural defect conditions caused by the pores can be reduced), thereby improving the structural stability of the capacitor assembly package structure (for example, the vibration resistance of the capacitor structures of the capacitor assembly package structure can be improved, so that the electrical characteristics of the capacitor assembly package structure provided by the present disclosure are not easily degraded by vibration), and excessive moisture can be prevented from accumulating in the pores, thereby reducing the probability of structural cracks in the capacitor assembly package structure during the reflow process.

Moreover, in the electronic device using the capacitor assembly package structure provided by the present disclosure, by virtue of "the first insulating package bodies being configured to be respectively received in the stacking gaps of the capacitor assembly," "the second insulating package body being configured to cover the first insulating package bodies and the capacitor structures," "a solid content of each of the first insulating package bodies being less than a solid content of the second insulating package body" and "a total volume of the first insulating package bodies being smaller than a volume of the second insulating package body," the percentage of the pores formed in each stacking gap of the capacitor assembly can be reduced (that is to say, the structural defect rate or structural defect conditions caused by the pores can be reduced), thereby improving the structural stability of the capacitor assembly package structure (for example, the vibration resistance of the capacitor structures of the capacitor assembly package structure can be improved, so that the electrical characteristics of the capacitor assembly package structure provided by the present disclosure are not easily degraded by vibration), and excessive moisture can be prevented from accumulating in the pores, thereby reducing the probability of structural cracks in the capacitor assembly package structure during the reflow process.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 8 is a flowchart of a method of manufacturing the capacitor structure package structure provided by a fourth embodiment of the present disclosure.

DETAILED DESCRIPTION OF THE EXEMPLARY EMBODIMENTS

Figure 1:
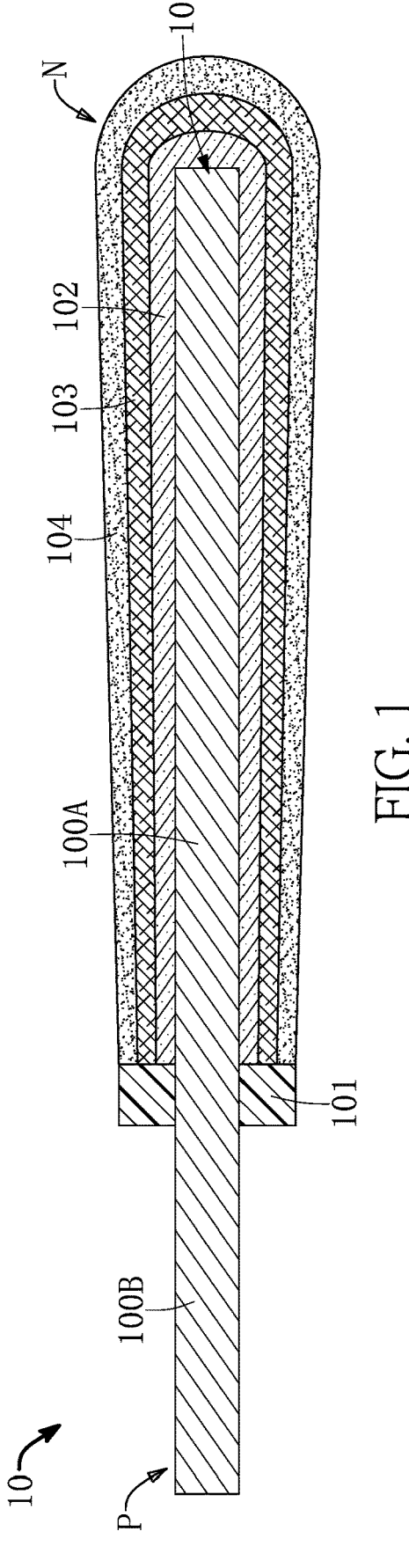
FIG. 1 is a schematic cross-sectional view of a capacitor structure provided by the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
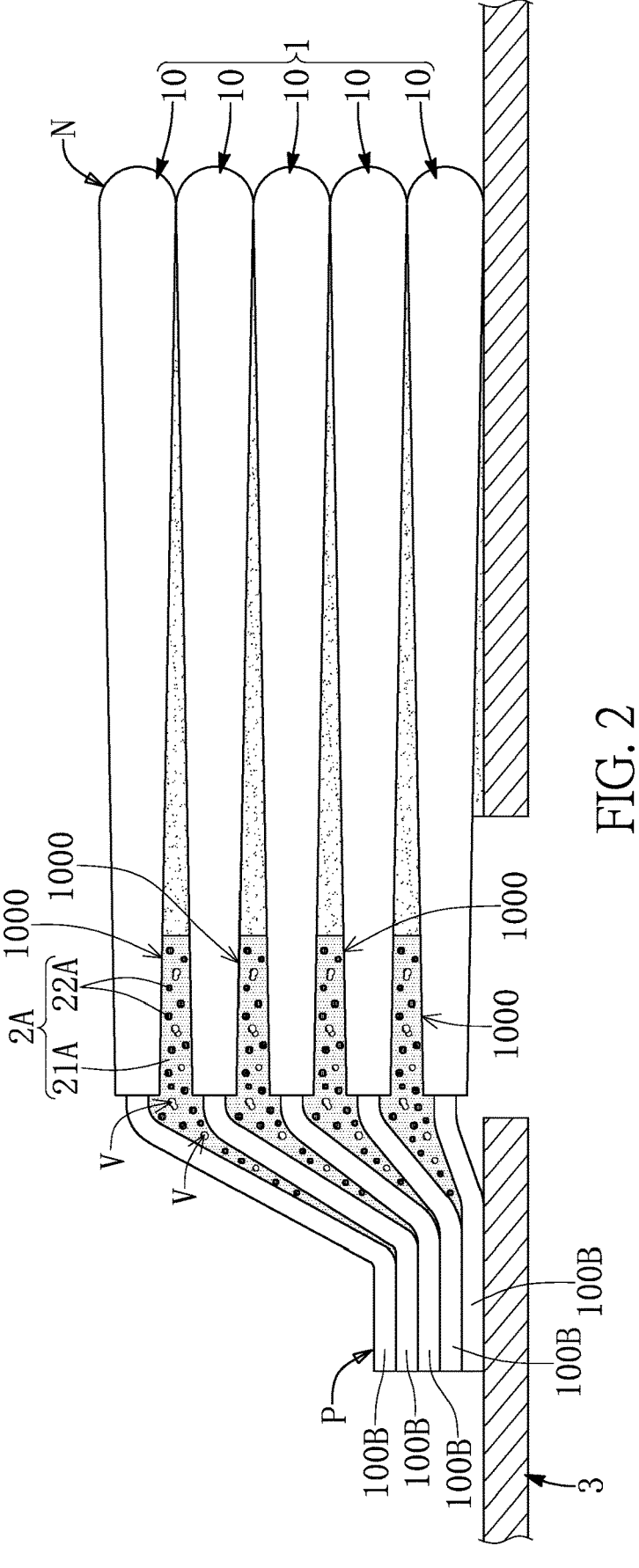
FIG. 2 is a schematic cross-sectional view of a plurality of first insulating package bodies respectively accommodated in a plurality of stacking gaps of the capacitor assembly according to a first embodiment of the present disclosure.
Figure 3:
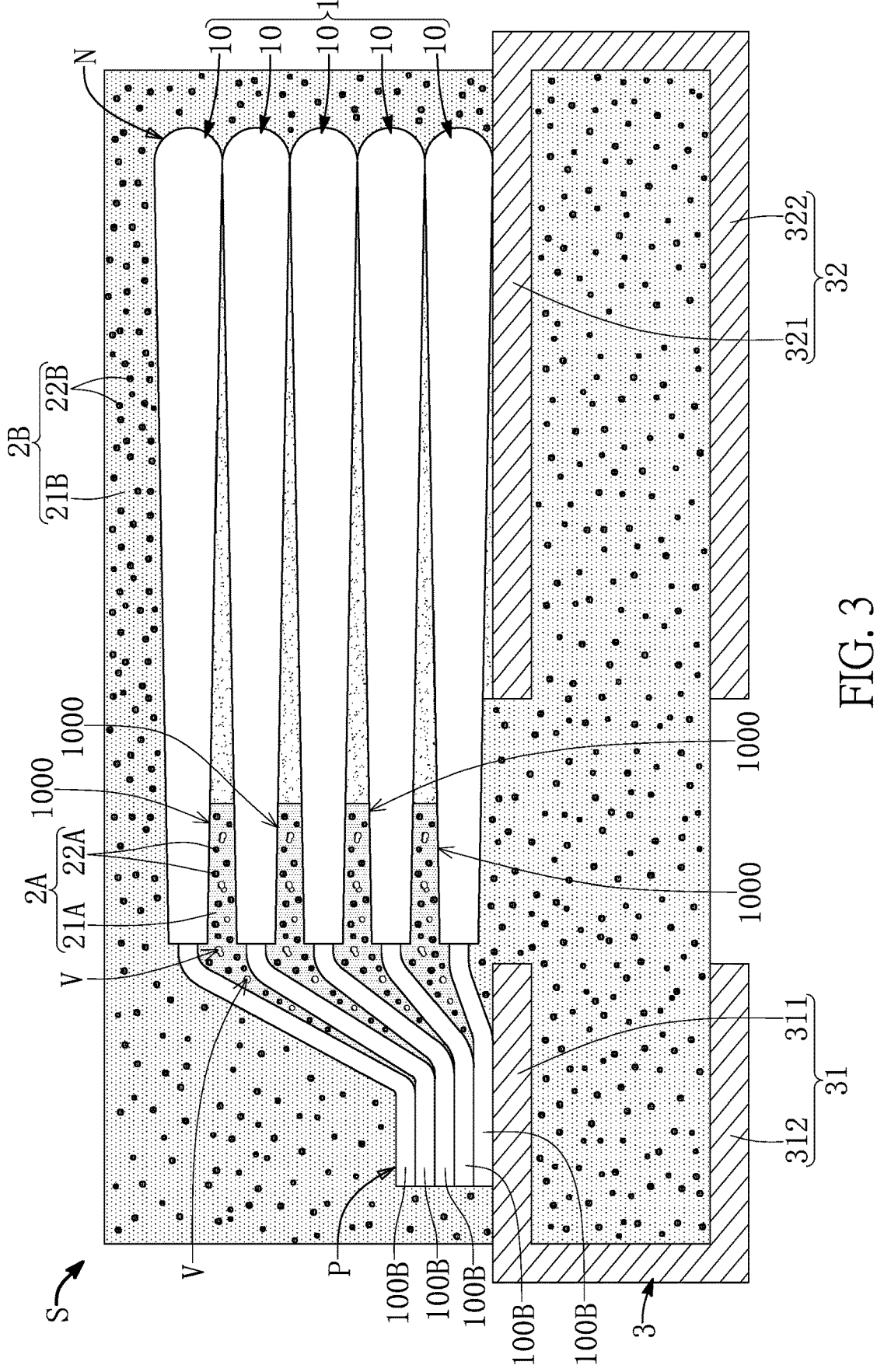
FIG. 3 is a schematic cross-sectional view of the capacitor assembly package structure provided by the first embodiment of the present disclosure.

Referring to FIG. 1 to FIG. 3, a first embodiment of the present disclosure provides a capacitor assembly package structure S, which includes a capacitor assembly 1, a plurality of first insulating package bodies 2A, a second insulating package body 2B and an electrode assembly 3. It should be noted that the capacitor assembly 1 includes a plurality of capacitor structures 10 that are stacked in sequence and electrically connected to each other, and each of the capacitor structures 10 has a positive electrode portion P and a negative electrode portion N. When the capacitor structures 10 are stacked on top of one another in sequence and electrically connected to each other, the capacitor assembly 1 has a plurality of stacking gaps 1000, and each of the stacking gaps 1000 (or voids, or spaces, or slots) is correspondingly formed between two adjacent ones of the capacitor structures 10.

For example, as shown in FIG. 1, each of the capacitor structures 10 includes a metal foil 100, an insulating position-limiting layer 101 (or an insulating surrounding layer), a conductive polymer layer 102, a carbon glue layer 103 and a silver glue layer 104 (such as a silver glue layer formed by solidification, or a nanometer silver layer formed by sintering and having an average thickness less than or equal to 1 μm). More particularly, the insulating position-limiting layer 101 can be disposed around a first portion 100A of the metal foil 100. The conductive polymer layer 102 can be configured for covering or enclosing the first portion 100A of the metal foil 100 and contacting the insulating position-limiting layer 101, but the conductive polymer layer 102 does not contact the second portion 100B of the metal foil 100 due to the barrier of the insulating position-limiting layer 101. The carbon glue layer 103 can be configured for covering or enclosing the conductive polymer layer 102 and contacting the insulating position-limiting layer 101, but the carbon glue layer 103 does not contact the second portion 100B of the metal foil 100 due to the barrier of the insulating position-limiting layer 101. The silver glue layer 104 can be configured for covering or enclosing the carbon glue layer 103 and contacting the insulating position-limiting layer 101, but the silver glue layer 104 does not contact the second portion 100B of the metal foil 100 due to the barrier of the insulating position-limiting layer 101. Moreover, the metal foil 100 can be aluminum foil, copper foil or any kind of conductive foil, and the surface of the metal foil 100 has a corrosion layer and an oxide layer formed on the corrosion layer. Moreover, the metal foil 100 of each of the capacitor structures 10 has a second portion 100B that is not covered or enclosed by the insulating position-limiting layer 101, and the second portions 100B of the metal foils 100 of the capacitor structures 10 can be stacked on top of one another in sequence. In addition, the insulating position-limiting layer 101 can be silicone, epoxy or any kind of insulating material, and the conductive polymer layer 102 can be polyacetylene (PA), polypyrrole (PPy), polythiophene (PT), polyaniline (PANI), poly(p-phenylene) (PPP), poly(phenylene vinylene) (PPV), or the conductive polymer layer 102 can be polyphenylene sulfide, polypyrrole, polythiophene, polyphenylene, polythiazole, etc. However, the aforementioned details are disclosed for exemplary purposes only, and are not meant to limit the scope of the present disclosure.

Moreover, referring to FIG. 2 and FIG. 3, the first insulating package bodies 2A can be configured to be respectively received or accommodated in the stacking gaps 1000 of the capacitor assembly 1, and the second insulating package body 2B can be configured to cover or enclose the first insulating package bodies 2A and the capacitor structures 10. For example, in one of the feasible or preferred embodiments, each of the first insulating package bodies 2A includes a first insulating material 21A (or a first insulating resin) and a plurality of first insulating particles 22A mixed with (or mixed inside) the first insulating material 21A (as shown in FIG. 2), and the second insulating package body 2B includes a second insulating material 21B (or a second insulating resin) and a plurality of second insulating particles 22B mixed with (or mixed inside) the second insulating material 21B (as shown in FIG. 3). It should be noted that a total volume of the first insulating package bodies 2A is smaller than a volume of the second insulating package body 2B. However, the aforementioned details are disclosed for exemplary purposes only, and are not meant to limit the scope of the present disclosure.

For example, referring to FIG. 2 and FIG. 3, in one of the feasible or preferred embodiments, a solid content of each of the first insulating package bodies 2A (i.e., the content of solid particles in each first insulating package body 2A after the insulating package material is dried or cured) is less than a solid content of the second insulating package body 2B (i.e., the content of solid particles in the second insulating package body 2B after the insulating package material is dried or cured). More particularly, the solid content of each of the first insulating package bodies 2A can be substantially between 5% and 79% (that is to say, in each first insulating package body 2A, the content ratio or weight percentage of the first insulating particles 22A may be any integer percentage between 5% and 79%), and the solid content of the second insulating package body 2B can be substantially between 80% and 95% (that is to say, in the second insulating package body 2B, the content ratio or weight percentage of the second insulating particles 22B may be any integer percentage between 80% and 95%). In other words, a density of the first insulating particles 22A of each first insulating package body 2A (i.e., the mass occupied by the first insulating particles 22A in each first insulating package body 2A) may be smaller than a density of the second insulating particles 22B of the second insulating package body 2B (i.e., the mass occupied by the second insulating particles 22B in the second insulating package body 2B). It should be noted that the first insulating package bodies 2A may have the same or different solid contents. However, the aforementioned details are disclosed for exemplary purposes only, and are not meant to limit the scope of the present disclosure.

For example, referring to FIG. 2 and FIG. 3, in one of the feasible or preferred embodiments, each of the first insulating package bodies 2A and the second insulating package body 2B may have the same or different insulating materials, and the first insulating package bodies 2A may have the same insulating material. In addition, the first insulating material 21A of each of the first insulating package bodies 2A and the second insulating material 21B of the second insulating package body 2B may have the same insulating material or different insulating materials, and each of the first insulating particles 22A of each of the first insulating package bodies 2A and each of the second insulating particles 22B of the second insulating package body 2B may have the same insulating material or different insulating materials. More particularly, the first insulating material 21A of each of the first insulating package bodies 2A can be silicone, epoxy resin or any kind of insulating material, and each of the first insulating particles 22A of each of the first insulating package bodies 2A can be silicon dioxide ($SiO_2$), aluminum trioxide ($Al_2O_3$) or any kind of oxide. In addition, the second insulating material 21B of the second insulating package body 2B can be silicone, epoxy resin or any kind of insulating material, and each of the second insulating particles 22B of the second insulating package body 2B can be silicon dioxide ($SiO_2$), aluminum trioxide ($Al_2O_3$) or any kind of oxide. It should be noted that as shown in FIG. 2, when the capacitor structures 10 of the capacitor assembly 1 are pre-stacked on the electrode assembly 3 that has not been bent yet, the second portions 100B of the metal foils 100 of the capacitor structures 10 are bent and stacked on the electrode assembly 3 that has not been bent yet. However, the aforementioned details are disclosed for exemplary purposes only, and are not meant to limit the scope of the present disclosure.

In addition, as shown in FIG. 3, the electrode assembly 3 including a first electrode structure 31 and a second electrode structure 32, the first electrode structure 31 and the second insulating package body 2B can cooperate with each other and be electrically connected to the positive electrode portion P of the capacitor structure 10, and the second electrode structure 32 and the second insulating package body 2B can cooperate with each other and be electrically connected to the negative electrode portion N of the capacitor structure 10. For example, in one of the feasible or preferred embodiments, the electrode assembly 3 can be a conductive pin assembly (or a lead frame assembly). More particularly, when the electrode assembly 3 is the conductive pin assembly, the first electrode structure 31 of the electrode assembly 3 includes a first embedded portion 311 covered or enclosed by the second insulating package body 2B and a first exposed portion 312 connected to the first embedded portion 311 and exposed from the second insulating package body 2B, the first embedded portion 311 of the first electrode structure 31 can be electrically connected to the positive electrode portion P of the capacitor structure 10 through conductive materials, and the first exposed portion 312 of the first electrode structure 31 can extend along an outer surface of the second insulating package body 2B. In addition, when the electrode assembly 3 is the conductive pin assembly, the second electrode structure 32 of the electrode assembly 3 includes a second embedded portion 321 covered or enclosed by the second insulating package body 2B and a second exposed portion 322 connected to the second embedded portion 321 and exposed from the second insulating package body 2B, the second embedded portion 321 of the second electrode structure 32 can be electrically connected to the negative electrode portion N of the capacitor structure 10 through conductive materials, and the second exposed portion 322 of the second electrode structure 32 can extend along the outer surface of the second insulating package body 2B. However, the aforementioned details are disclosed for exemplary purposes only, and are not meant to limit the scope of the present disclosure.

Therefore, the first insulating package bodies 2A can be configured to respectively fill the stacking gaps 1000 of the capacitor assembly 1, so that the capacitor assembly package structure S provided by the present disclosure can be used to reduce a percentage of pores V (or voids) formed within each of the stacking gaps 1000 of the capacitor assembly 1. For example, in one of the feasible or preferred embodiments, a filling rate of each of the stacking gaps 1000 filled by a corresponding one of the first insulating package bodies 2A can be substantially between 85% and 95% (such as any integer between approximately 85% and 95%). That is to say, the percentage of the pores V (or voids) formed in each stacking gap 1000 of the capacitor assembly 1 can be reduced to between approximately 5% and 15% (for example, the percentage of the pores V can be reduced to any integer between about 5% and 15%, or the percentage of the pores V can also be reduced to less than 5% such as any integer between approximately 0% and 5%). However, the aforementioned details are disclosed for exemplary purposes only, and are not meant to limit the scope of the present disclosure.

Second Embodiment

Figure 4:
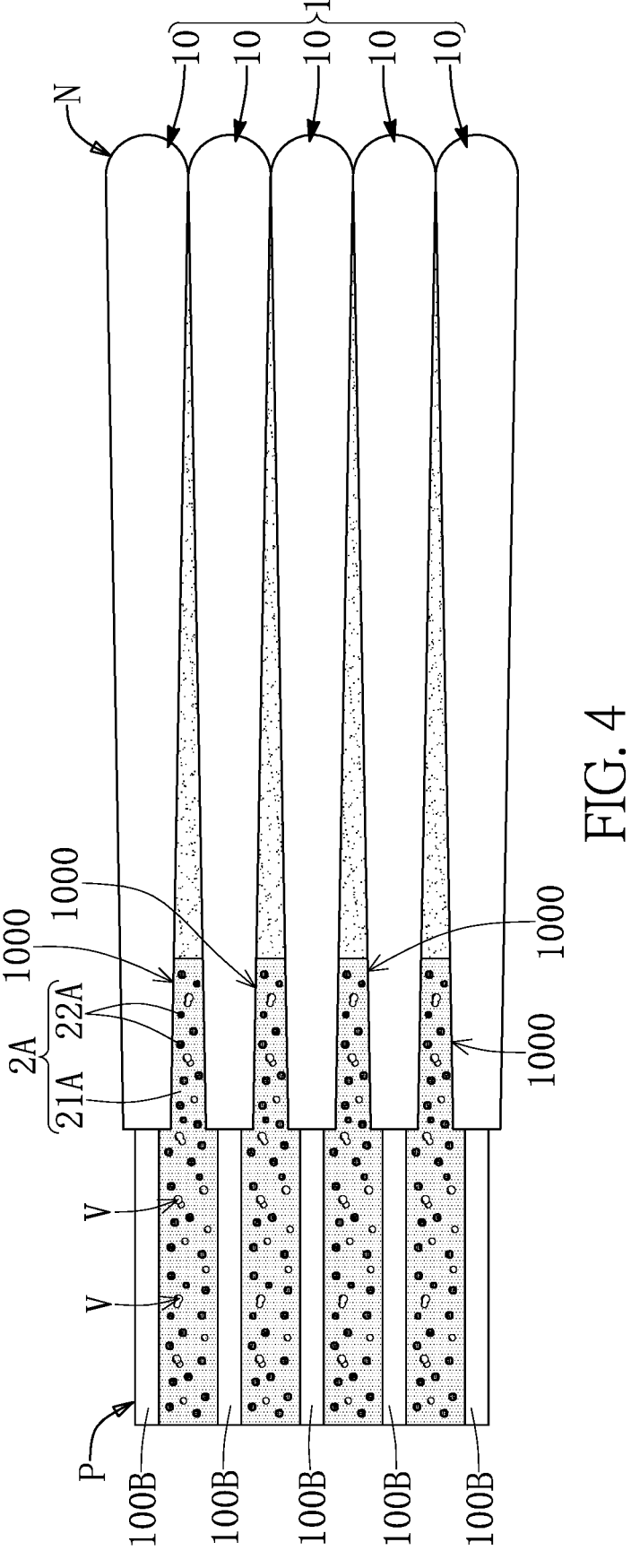
FIG. 4 is a schematic cross-sectional view of the first insulating package bodies respectively accommodated in the stacking gaps of the capacitor assembly according to a second embodiment of the present disclosure.
Figure 5:
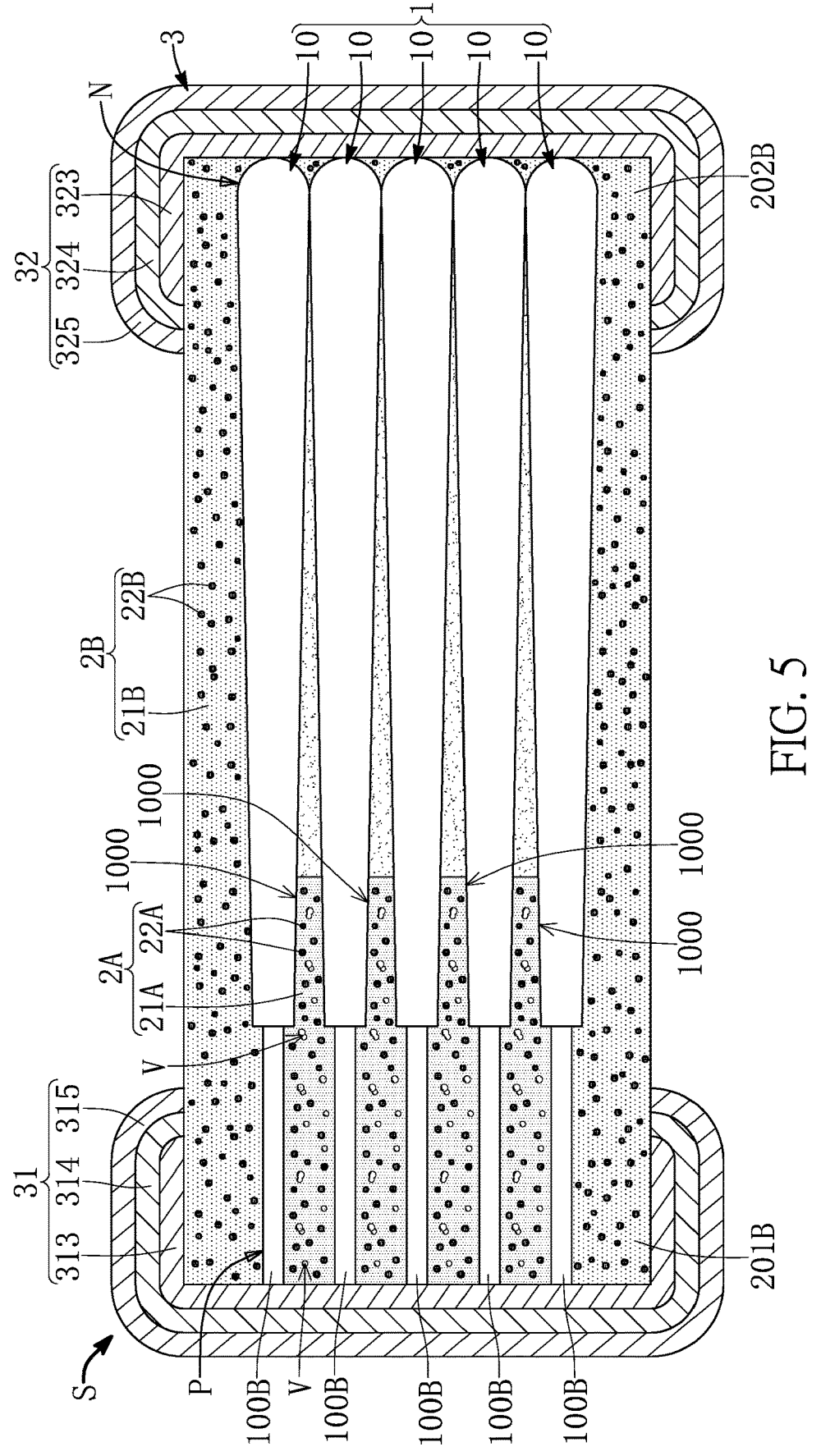
FIG. 5 is a schematic cross-sectional view of the capacitor assembly package structure provided by the second embodiment of the present disclosure.

Referring to FIG. 4 and FIG. 5, a second embodiment of the present disclosure provides a capacitor assembly package structure S, which includes a capacitor assembly 1, a plurality of first insulating package bodies 2A, a second insulating package body 2B and an electrode assembly 3. Comparing FIG. 4 with FIG. 2, and comparing FIG. 5 with FIG. 3, the main difference between the second embodiment and the first embodiment is as follows: in the second embodiment, the electrode assembly 3 can be a terminal electrode assembly (or a lateral terminal assembly), and the second portions 100B of the metal foils 100 of the capacitor structures 10 can be separate from each other.

More particularly, when the electrode assembly 3 is the terminal electrode assembly, the first electrode structure 31 of the electrode assembly 3 includes a first inner conductive layer 313 configured to cover or enclose a first side portion 201B of the second insulating package body 2B and electrically contact the positive electrode portion P of the capacitor structure 10, a first intermediate conductive layer 314 configured to cover or enclose the first inner conductive layer 313, and a first outer conductive layer 315 configured to cover or enclose the first intermediate conductive layer 314. Moreover, when the electrode assembly 3 is the terminal electrode assembly, the second electrode structure 32 of the electrode assembly 3 includes a second inner conductive layer 323 configured to cover or enclose a second side portion 202B of the second insulating package body 2B and electrically contact the negative electrode portion N of the capacitor structure 10, a second intermediate conductive layer 324 configured to cover or enclose the second inner conductive layer 323, and a second outer conductive layer 325 configured to cover or enclose the second intermediate conductive layer 324. For example, the first inner conductive layer 313 can be one of a silver-containing material layer (such as Ag layer) and a copper-containing material layer (such as Cu layer), the first intermediate conductive layer 314 can be a nickel-containing material layer (such as Ni layer), and the first outer conductive layer 315 can be a tin-containing material layer (such as Sn layer). In addition, the second inner conductive layer 323 can be one of a silver-containing material layer (such as Ag layer) and a copper-containing material layer (such as Cu layer), the second intermediate conductive layer 324 can be a nickel-containing material layer (such as Ni layer), and the second outer conductive layer 325 can be a tin-containing material layer (such as Sn layer). However, the aforementioned details are disclosed for exemplary purposes only, and are not meant to limit the scope of the present disclosure.

Third Embodiment

Figure 6:
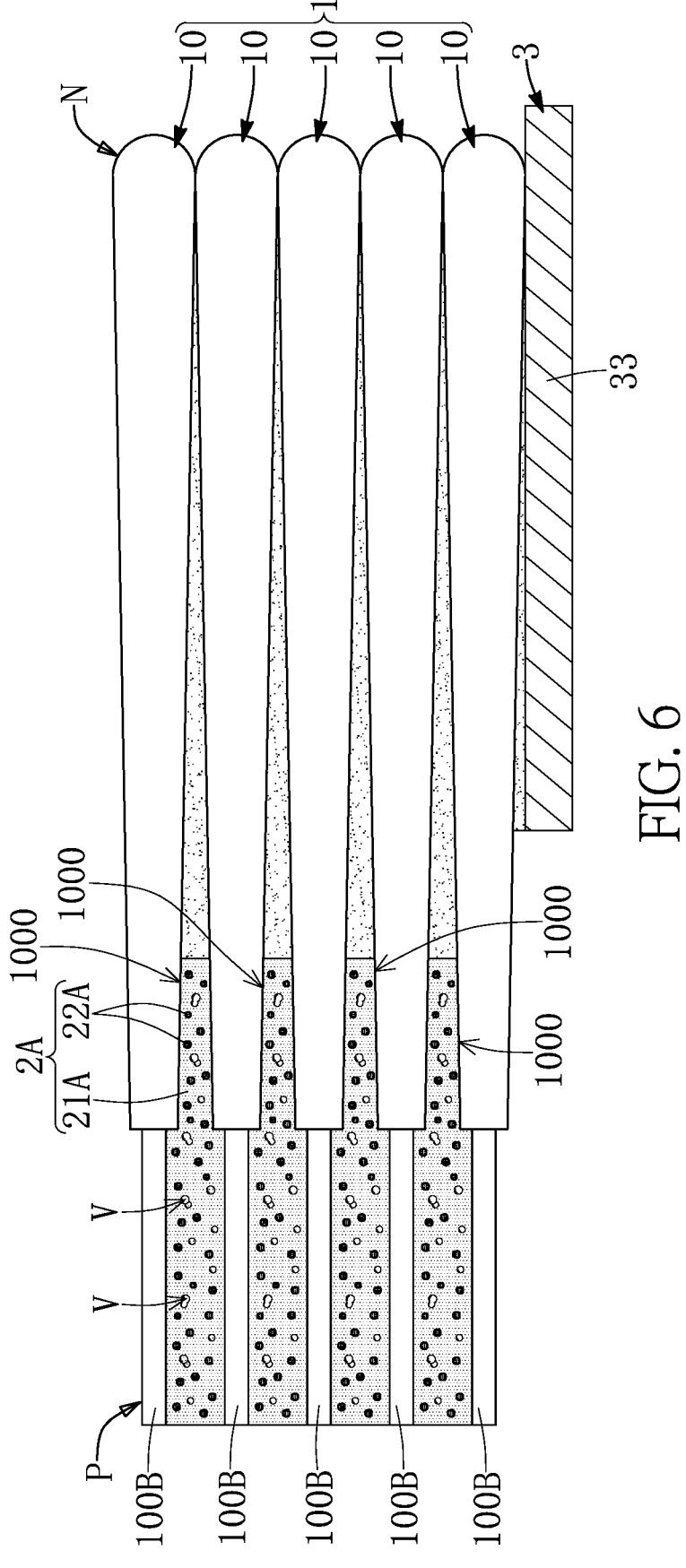
FIG. 6 is a schematic cross-sectional view of the first insulating package bodies respectively accommodated in the stacking gaps of the capacitor assembly according to a third embodiment of the present disclosure.
Figure 7:
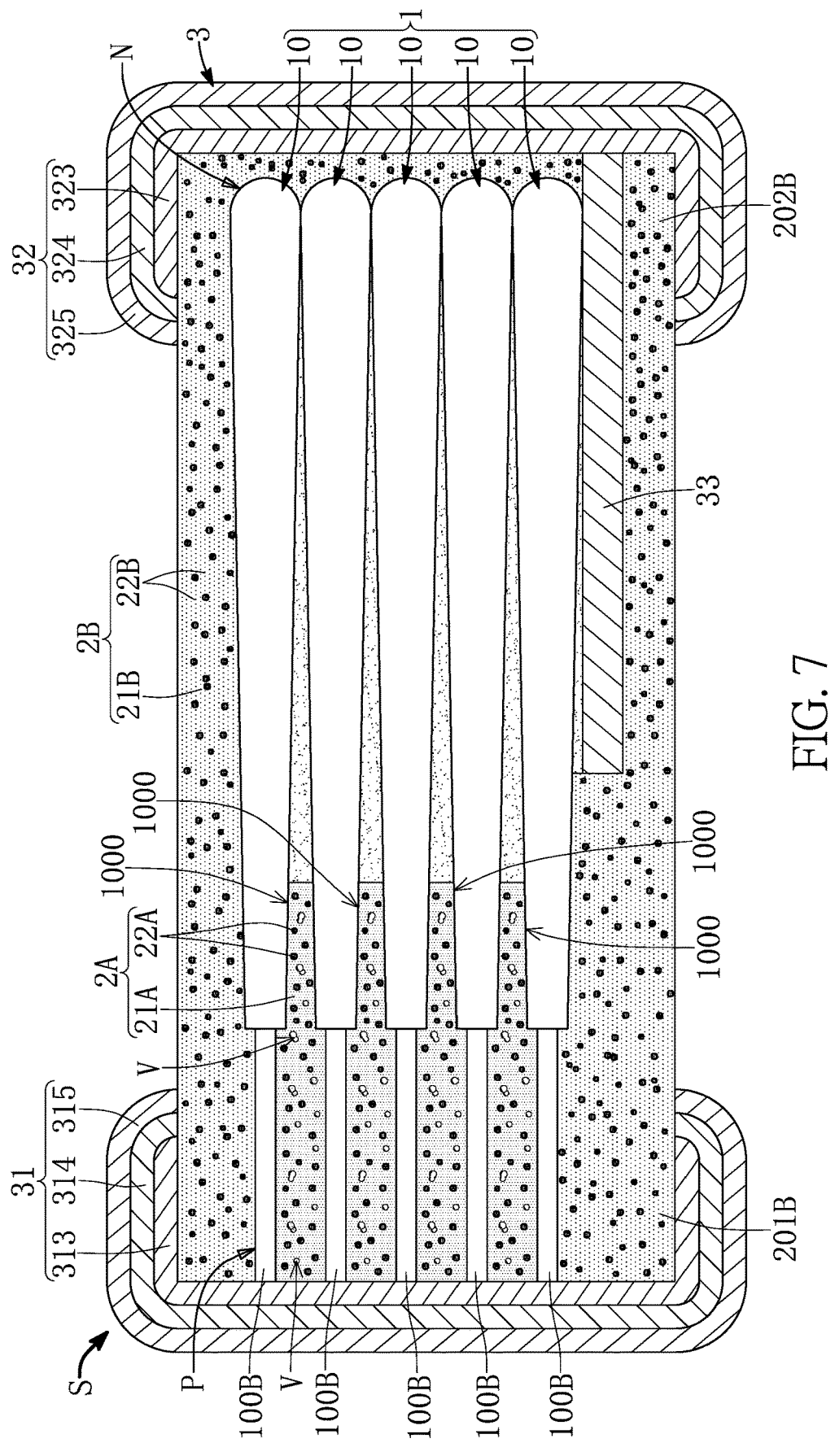
FIG. 7 is a schematic cross-sectional view of the capacitor assembly package structure provided by the third embodiment of the present disclosure.

Referring to FIG. 6 and FIG. 7, a third embodiment of the present disclosure provides a capacitor assembly package structure S, which includes a capacitor assembly 1, a plurality of first insulating package bodies 2A, a second insulating package body 2B and an electrode assembly 3. Comparing FIG. 6 with FIG. 4, and comparing FIG. 7 with FIG. 5, the main difference between the third embodiment and the second embodiment is as follows: in the third embodiment, when the electrode assembly 3 can be the terminal electrode assembly, the capacitor structures 10 can be carried by a conductive carrier substrate 33, and the negative electrode portion N of the capacitor structure 10 can be electrically connected to the second electrode structure 32 of the electrode assembly 3 through the conductive carrier substrate 33.

Fourth Embodiment

Referring to FIG. 8, a fourth embodiment of the present disclosure provides a method of manufacturing a capacitor assembly package structure S, which includes: firstly, referring to FIG. 1, FIG. 2 (or FIG. 4, or FIG. 6) and FIG. 8, providing a capacitor assembly 1, in which the capacitor assembly 1 includes a plurality of capacitor structures 10 that are stacked in sequence and electrically connected to each other, each of the capacitor structures 10 has a positive electrode portion P and a negative electrode portion N, the capacitor assembly 1 has a plurality of stacking gaps 1000, and each of the stacking gaps 1000 is correspondingly formed between two adjacent ones of the capacitor structures 10 (step S100); next, referring to FIG. 2 (or FIG. 4, or FIG. 6) and FIG. 8, forming a plurality of first insulating package bodies 2A that are configured to be respectively received in the stacking gaps 1000 of the capacitor assembly 1 (step S102); and then referring to FIG. 3 (or FIG. 5, or FIG. 7) and FIG. 8, forming a second insulating package body 2B that is configured to cover or enclose the first insulating package bodies 2A and the capacitor structures 10 (step S104). It should be noted that a solid content of each of the first insulating package bodies 2A is less than a solid content of the second insulating package body 2B.

For example, referring to FIG. 2 and FIG. 3, in the step S100 of providing the capacitor assembly 1, the capacitor structures 10 can be stacked and arranged on an electrode assembly 3, but the electrode assembly 3 as shown in FIG. 4 has not been bent into the electrode assembly 3 as shown in FIG. 5. However, the aforementioned details are disclosed for exemplary purposes only, and are not meant to limit the scope of the present disclosure.

For example, referring to FIG. 4 and FIG. 5, after the step S104 of forming the second insulating package body 2B, an electrode assembly 3 (including a first electrode structure 31 and a second electrode structure 32) can cooperate with the second insulating package body 2B so as to electrically connect to the capacitor assembly 1. However, the aforementioned details are disclosed for exemplary purposes only, and are not meant to limit the scope of the present disclosure.

For example, referring to FIG. 6 and FIG. 7, in the step S100 of providing the capacitor assembly 1, the capacitor structures 10 can be carried by a conductive carrier substrate 33, and the negative electrode portion N of the capacitor structure 10 can be electrically connected to the second electrode structure 32 of the electrode assembly 3 through the conductive carrier substrate 33. However, the aforementioned details are disclosed for exemplary purposes only, and are not meant to limit the scope of the present disclosure.

Therefore, as shown in FIG. 3, FIG. 5 or FIG. 7, the first insulating package bodies 2A can be configured to respectively fill the stacking gaps 1000 of the capacitor assembly 1, so that the capacitor assembly package structure S provided by the present disclosure can be used to reduce a percentage of pores V (or voids) formed within each of the stacking gaps 1000 of the capacitor assembly 1. For example, in one of the feasible or preferred embodiments, a filling rate of each of the stacking gaps 1000 filled by a corresponding one of the first insulating package bodies 2A can be substantially between 85% and 95% (such as any integer between approximately 85% and 95%). That is to say, the percentage of the pores V (or voids) formed in each stacking gap 1000 of the capacitor assembly 1 can be reduced to between approximately 5% and 15% (for example, the percentage of the pores V can be reduced to any integer between about 5% and 15%, or the percentage of the pores V can also be reduced to less than 5% such as any integer between approximately 0% and 5%). However, the aforementioned details are disclosed for exemplary purposes only, and are not meant to limit the scope of the present disclosure.

Fifth Embodiment

Figure 9:
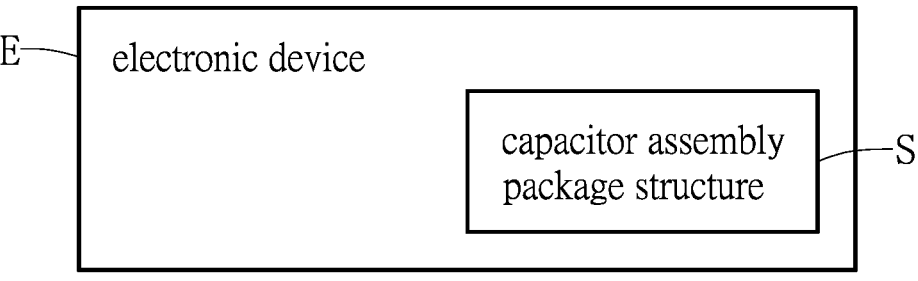
FIG. 9 is a functional block diagram of an electronic device according to a fifth embodiment of the present disclosure.

Referring to FIG. 9, a fifth embodiment of the present disclosure provides an electronic device E configured to use a capacitor assembly package structure S (as shown in FIG. 3, FIG. 5 or FIG. 7) as provided in one of the first to third embodiments. For example, the electronic device E may be a portable electronic device (such as a desktop computer, a notebook computer, or a tablet computer) or a mobile device (such as a car, a boat, an airplane, or any other means of transportation). However, the aforementioned details are disclosed for exemplary purposes only, and are not meant to limit the scope of the present disclosure.

Beneficial Effects of the Embodiments

In conclusion, in the capacitor assembly package structure S provided by the present disclosure, by virtue of "the first insulating package bodies 2A being configured to be respectively received in the stacking gaps 1000 of the capacitor assembly 1," "the second insulating package body 2B being configured to cover or enclose the first insulating package bodies 2A and the capacitor structures 10," "a solid content of each of the first insulating package bodies 2A being less than a solid content of the second insulating package body 2B" and "a total volume of the first insulating package bodies 2A being smaller than a volume of the second insulating package body 2B," the percentage of the pores V formed in each stacking gap of the capacitor assembly 1 can be reduced (that is to say, the structural defect rate or structural defect conditions caused by the pores V can be reduced), thereby improving the structural stability of the capacitor assembly package structure S (for example, the vibration resistance of the capacitor structures 10 of the capacitor assembly package structure S can be improved, so that the electrical characteristics of the capacitor assembly package structure S provided by the present disclosure are not easily degraded by vibration), and excessive moisture can be prevented from accumulating in the pores V, thereby reducing the probability of structural cracks in the capacitor assembly package structure S during the reflow process.

Furthermore, in the method of manufacturing the capacitor assembly package structure S provided by the present disclosure, by virtue of "forming a plurality of first insulating package bodies 2A that are configured to be respectively received in the stacking gaps 1000 of the capacitor assembly 1," "forming a second insulating package body 2B that is configured to cover or enclose the first insulating package bodies 2A and the capacitor structures 10," "a solid content of each of the first insulating package bodies 2A being less than a solid content of the second insulating package body 2B" and "a total volume of the first insulating package bodies 2A being smaller than a volume of the second insulating package body 2B," the percentage of the pores V formed in each stacking gap of the capacitor assembly 1 can be reduced (that is to say, the structural defect rate or structural defect conditions caused by the pores V can be reduced), thereby improving the structural stability of the capacitor assembly package structure S (for example, the vibration resistance of the capacitor structures 10 of the capacitor assembly package structure S can be improved, so that the electrical characteristics of the capacitor assembly package structure S provided by the present disclosure are not easily degraded by vibration), and excessive moisture can be prevented from accumulating in the pores V, thereby reducing the probability of structural cracks in the capacitor assembly package structure S during the reflow process.

Moreover, in the electronic device using the capacitor assembly package structure S provided by the present disclosure, by virtue of "the first insulating package bodies 2A being configured to be respectively received in the stacking gaps 1000 of the capacitor assembly 1," "the second insulating package body 2B being configured to cover or enclose the first insulating package bodies 2A and the capacitor structures 10," "a solid content of each of the first insulating package bodies 2A being less than a solid content of the second insulating package body 2B" and "a total volume of the first insulating package bodies 2A being smaller than a volume of the second insulating package body 2B," the percentage of the pores V formed in each stacking gap of the capacitor assembly 1 can be reduced (that is to say, the structural defect rate or structural defect conditions caused by the pores V can be reduced), thereby improving the structural stability of the capacitor assembly package structure S (for example, the vibration resistance of the capacitor structures 10 of the capacitor assembly package structure S can be improved, so that the electrical characteristics of the capacitor assembly package structure S provided by the present disclosure are not easily degraded by vibration), and excessive moisture can be prevented from accumulating in the pores V, thereby reducing the probability of structural cracks in the capacitor assembly package structure S during the reflow process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A capacitor assembly package structure, comprising:
   a capacitor assembly including a plurality of capacitor structures that are stacked in sequence and electrically connected to each other, wherein each of the capacitor structures has a positive electrode portion and a negative electrode portion, the capacitor assembly has a plurality of stacking gaps, and each of the stacking gaps is correspondingly formed between two adjacent ones of the capacitor structures;
   a plurality of first insulating package bodies configured to be respectively received in the stacking gaps of the capacitor assembly;
   a second insulating package body configured to cover the first insulating package bodies and the capacitor structures; and
   an electrode assembly including a first electrode structure and a second electrode structure, wherein the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure;
   wherein a solid content of each of the first insulating package bodies is less than a solid content of the second insulating package body;
   wherein a total volume of the first insulating package bodies is smaller than a volume of the second insulating package body;
   wherein each of the first insulating package bodies and the second insulating package body have the same or different insulating materials.

2. The capacitor assembly package structure according to claim 1, wherein each of the capacitor structures includes a metal foil, an insulating position-limiting layer disposed around a first portion of the metal foil, a conductive polymer layer for covering the first portion of the metal foil and contacting the insulating position-limiting layer, a carbon glue layer for covering the conductive polymer layer and contacting the insulating position-limiting layer, and a silver glue layer for covering the carbon glue layer and contacting the insulating position-limiting layer;

wherein, a second portion of the metal foil of each of the capacitor structures is not covered by the insulating position-limiting layer, and the second portions of the metal foils of the capacitor structures are stacked in sequence or separate from each other;

wherein the solid content of each of the first insulating package bodies is between 5% and 79%, and the solid content of the second insulating package body is between 80% and 95%;

wherein the first insulating package bodies have the same insulating material, and the first insulating package bodies have the same solid content;

wherein each of the first insulating package bodies includes a first insulating material and a plurality of first insulating particles mixed with the first insulating material, and the second insulating package body includes a second insulating material and a plurality of second insulating particles mixed with the second insulating material;

wherein the first insulating material of each of the first insulating package bodies is silicone or epoxy resin, and each of the first insulating particles of each of the first insulating package bodies is silicon dioxide or aluminum trioxide;

wherein the second insulating material of the second insulating package body is silicone or epoxy resin, and each of the second insulating particles of the second insulating package body is silicon dioxide or aluminum trioxide;

wherein a density of the first insulating particles of each of the first insulating package bodies is smaller than a density of the second insulating particles of the second insulating package body;

wherein the first insulating material of each of the first insulating package bodies and the second insulating material of the second insulating package body have the same insulating material or different insulating materials, and each of the first insulating particles of each of the first insulating package bodies and each of the second insulating particles of the second insulating package body have the same insulating material or different insulating materials;

wherein the first insulating package bodies are configured to respectively fill the stacking gaps of the capacitor assembly, thereby reducing a percentage of pores formed within each of the stacking gaps of the capacitor assembly;

wherein a filling rate of each of the stacking gaps filled by a corresponding one of the first insulating package bodies is between 85% and 95%.

3. The capacitor assembly package structure according to claim 1, wherein the electrode assembly is a conductive pin assembly or a terminal electrode assembly;

wherein, when the electrode assembly is the conductive pin assembly, the first electrode structure of the electrode assembly includes a first embedded portion covered by the second insulating package body and a first exposed portion connected to the first embedded portion and exposed from the second insulating package body, the first embedded portion of the first electrode structure is electrically connected to the positive electrode portion of the capacitor structure, and the first exposed portion of the first electrode structure extends along an outer surface of the second insulating package body;

wherein, when the electrode assembly is the conductive pin assembly, the second electrode structure of the electrode assembly includes a second embedded portion covered by the second insulating package body and a second exposed portion connected to the second embedded portion and exposed from the second insulating package body, the second embedded portion of the second electrode structure is electrically connected to the negative electrode portion of the capacitor structure, and the second exposed portion of the second electrode structure extends along the outer surface of the second insulating package body;

wherein, when the electrode assembly is the terminal electrode assembly, the first electrode structure of the electrode assembly includes a first inner conductive layer configured to cover a first side portion of the second insulating package body and electrically contact the positive electrode portion of the capacitor structure, a first intermediate conductive layer configured to cover the first inner conductive layer, and a first outer conductive layer configured to cover the first intermediate conductive layer, the first inner conductive layer is one of a silver-containing material layer and a copper-containing material layer, the first intermediate conductive layer is a nickel-containing material layer, and the first outer conductive layer is a tin-containing material layer;

wherein, when the electrode assembly is the terminal electrode assembly, the second electrode structure of the electrode assembly includes a second inner conductive layer configured to cover a second side portion of the second insulating package body and electrically contact the negative electrode portion of the capacitor structure, a second intermediate conductive layer configured to cover the second inner conductive layer, and a second outer conductive layer configured to cover the second intermediate conductive layer, the second inner conductive layer is one of a silver-containing material layer and a copper-containing material layer, the second intermediate conductive layer is a nickel-containing material layer, and the second outer conductive layer is a tin-containing material layer;

wherein, when the electrode assembly is the terminal electrode assembly, the capacitor structures are carried by a conductive carrier substrate, and the negative electrode portion of the capacitor structure is electrically connected to the second electrode structure of the electrode assembly through the conductive carrier substrate.

4. A method of manufacturing a capacitor assembly package structure, comprising:

providing a capacitor assembly, wherein the capacitor assembly includes a plurality of capacitor structures that are stacked in sequence and electrically connected to each other, each of the capacitor structures has a positive electrode portion and a negative electrode portion, the capacitor assembly has a plurality of stacking gaps, and each of the stacking gaps is correspondingly formed between two adjacent ones of the capacitor structures;

forming a plurality of first insulating package bodies that are configured to be respectively received in the stacking gaps of the capacitor assembly; and forming a second insulating package body that is configured to cover the first insulating package bodies and the capacitor structures;

wherein a solid content of each of the first insulating package bodies is less than a solid content of the second insulating package body;

wherein a total volume of the first insulating package bodies is smaller than a volume of the second insulating package body;

wherein each of the first insulating package bodies and the second insulating package body have the same or different insulating materials.

5. The method of manufacturing the capacitor assembly package structure according to claim 4, wherein, in the step of providing the capacitor assembly, the capacitor structures are stacked and arranged on an electrode assembly;

wherein the electrode assembly includes a first electrode structure and a second electrode structure, the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure;

wherein the first electrode structure of the electrode assembly includes a first embedded portion covered by the second insulating package body and a first exposed portion connected to the first embedded portion and exposed from the second insulating package body, the first embedded portion of the first electrode structure is electrically connected to the positive electrode portion of the capacitor structure, and the first exposed portion of the first electrode structure extends along an outer surface of the second insulating package body;

wherein the second electrode structure of the electrode assembly includes a second embedded portion covered by the second insulating package body and a second exposed portion connected to the second embedded portion and exposed from the second insulating package body, the second embedded portion of the second electrode structure is electrically connected to the negative electrode portion of the capacitor structure, and the second exposed portion of the second electrode structure extends along the outer surface of the second insulating package body.

6. The method of manufacturing the capacitor assembly package structure according to claim 4, wherein, after the step of forming the second insulating package body, an electrode assembly cooperates with the second insulating package body so as to electrically connect to the capacitor assembly;

wherein the electrode assembly includes a first electrode structure and a second electrode structure, the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure;

wherein the first electrode structure of the electrode assembly includes a first inner conductive layer configured to cover a first side portion of the second insulating package body and electrically contact the positive electrode portion of the capacitor structure, a first intermediate conductive layer configured to cover the first inner conductive layer, and a first outer conductive layer configured to cover the first intermediate conductive layer, the first inner conductive layer is one of a silver-containing material layer and a copper-containing material layer, the first intermediate conductive layer is a nickel-containing material layer, and the first outer conductive layer is a tin-containing material layer;

wherein the second electrode structure of the electrode assembly includes a second inner conductive layer configured to cover a second side portion of the second insulating package body and electrically contact the negative electrode portion of the capacitor structure, a second intermediate conductive layer configured to cover the second inner conductive layer, and a second outer conductive layer configured to cover the second intermediate conductive layer, the second inner conductive layer is one of a silver-containing material layer and a copper-containing material layer, the second intermediate conductive layer is a nickel-containing material layer, and the second outer conductive layer is a tin-containing material layer;

wherein, in the step of providing the capacitor assembly, the capacitor structures are carried by a conductive carrier substrate, and the negative electrode portion of the capacitor structure is electrically connected to the second electrode structure of the electrode assembly through the conductive carrier substrate.

7. The method of manufacturing the capacitor assembly package structure according to claim 4, wherein each of the capacitor structures includes a metal foil, an insulating position-limiting layer disposed around a first portion of the metal foil, a conductive polymer layer for covering the first portion of the metal foil and contacting the insulating position-limiting layer, a carbon glue layer for covering the conductive polymer layer and contacting the insulating position-limiting layer, and a silver glue layer for covering the carbon glue layer and contacting the insulating position-limiting layer;

wherein, a second portion of the metal foil of each of the capacitor structures is not covered by the insulating position-limiting layer, and the second portions of the metal foils of the capacitor structures are stacked in sequence or separate from each other;

wherein the solid content of each of the first insulating package bodies is between 5% and 79%, and the solid content of the second insulating package body is between 80% and 95%;

wherein the first insulating package bodies have the same insulating material, and the first insulating package bodies have the same solid content;

wherein each of the first insulating package bodies includes a first insulating material and a plurality of first insulating particles mixed with the first insulating material, and the second insulating package body includes a second insulating material and a plurality of second insulating particles mixed with the second insulating material;

wherein the first insulating material of each of the first insulating package bodies is silicone or epoxy resin, and each of the first insulating particles of each of the first insulating package bodies is silicon dioxide or aluminum trioxide;

wherein the second insulating material of the second insulating package body is silicone or epoxy resin, and each of the second insulating particles of the second insulating package body is silicon dioxide or aluminum trioxide;

wherein a density of the first insulating particles of each of the first insulating package bodies is smaller than a density of the second insulating particles of the second insulating package body;

wherein the first insulating material of each of the first insulating package bodies and the second insulating material of the second insulating package body have the same insulating material or different insulating materials, and each of the first insulating particles of each of the first insulating package bodies and each of the second insulating particles of the second insulating package body have the same insulating material or different insulating materials;

wherein the first insulating package bodies are configured to respectively fill the stacking gaps of the capacitor assembly, thereby reducing a percentage of pores formed within each of the stacking gaps of the capacitor assembly;

wherein a filling rate of each of the stacking gaps filled by a corresponding one of the first insulating package bodies is between 85% and 95%.

8. An electronic device configured to use a capacitor assembly package structure, the capacitor assembly package structure comprising:

a capacitor assembly including a plurality of capacitor structures that are stacked in sequence and electrically connected to each other, wherein each of the capacitor structures has a positive electrode portion and a negative electrode portion, the capacitor assembly has a plurality of stacking gaps, and each of the stacking gaps is correspondingly formed between two adjacent ones of the capacitor structures;

a plurality of first insulating package bodies configured to be respectively received in the stacking gaps of the capacitor assembly;

a second insulating package body configured to cover the first insulating package bodies and the capacitor structures; and an electrode assembly including a first electrode structure and a second electrode structure, wherein the first electrode structure and the second insulating package body cooperate with each other and are electrically connected to the positive electrode portion of the capacitor structure, and the second electrode structure and the second insulating package body cooperate with each other and are electrically connected to the negative electrode portion of the capacitor structure;

wherein a solid content of each of the first insulating package bodies is less than a solid content of the second insulating package body;

wherein a total volume of the first insulating package bodies is smaller than a volume of the second insulating package body;

wherein each of the first insulating package bodies and the second insulating package body have the same or different insulating materials.

9. The electronic device according to claim 8, wherein each of the capacitor structures includes a metal foil, an insulating position-limiting layer disposed around a first portion of the metal foil, a conductive polymer layer for covering the first portion of the metal foil and contacting the insulating position-limiting layer, a carbon glue layer for covering the conductive polymer layer and contacting the insulating position-limiting layer, and a silver glue layer for covering the carbon glue layer and contacting the insulating position-limiting layer;

wherein, a second portion of the metal foil of each of the capacitor structures is not covered by the insulating position-limiting layer, and the second portions of the metal foils of the capacitor structures are stacked in sequence or separate from each other;

wherein the solid content of each of the first insulating package bodies is between 5% and 79%, and the solid content of the second insulating package body is between 80% and 95%;

wherein the first insulating package bodies have the same insulating material, and the first insulating package bodies have the same solid content;

wherein each of the first insulating package bodies includes a first insulating material and a plurality of first insulating particles mixed with the first insulating material, and the second insulating package body includes a second insulating material and a plurality of second insulating particles mixed with the second insulating material;

wherein the first insulating material of each of the first insulating package bodies is silicone or epoxy resin, and each of the first insulating particles of each of the first insulating package bodies is silicon dioxide or aluminum trioxide;

wherein the second insulating material of the second insulating package body is silicone or epoxy resin, and each of the second insulating particles of the second insulating package body is silicon dioxide or aluminum trioxide;

wherein a density of the first insulating particles of each of the first insulating package bodies is smaller than a density of the second insulating particles of the second insulating package body;

wherein the first insulating material of each of the first insulating package bodies and the second insulating material of the second insulating package body have the same insulating material or different insulating materials, and each of the first insulating particles of each of the first insulating package bodies and each of the second insulating particles of the second insulating package body have the same insulating material or different insulating materials;

wherein the first insulating package bodies are configured to respectively fill the stacking gaps of the capacitor assembly, thereby reducing a percentage of pores formed within each of the stacking gaps of the capacitor assembly;

wherein a filling rate of each of the stacking gaps filled by a corresponding one of the first insulating package bodies is between 85% and 95%.

10. The electronic device according to claim 8, wherein the electrode assembly is a conductive pin assembly or a terminal electrode assembly.

* * * * *